(12) United States Patent
Lambert et al.

(10) Patent No.: US 11,537,544 B2
(45) Date of Patent: Dec. 27, 2022

(54) COMMUNICATING NON-ISOCHRONOUS DATA OVER AN ISOCHRONOUS CHANNEL

(71) Applicant: Cirrus Logic International Semiconductor Ltd., Edinburgh (GB)

(72) Inventors: Bradley A. Lambert, Austin, TX (US); Gabriel Vogel, Austin, TX (US); Yuchao Chen, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/014,099

(22) Filed: Sep. 8, 2020

(65) Prior Publication Data

US 2021/0073165 A1  Mar. 11, 2021

Related U.S. Application Data

(60) Provisional application No. 62/897,508, filed on Sep. 9, 2019.

(51) Int. Cl.
| | | |
|---|---|---|
| *G06F 13/40* | (2006.01) | |
| *G06F 5/06* | (2006.01) | |
| *G06F 13/42* | (2006.01) | |

(52) U.S. Cl.
CPC ............ *G06F 13/4009* (2013.01); *G06F 5/06* (2013.01); *G06F 5/065* (2013.01); *G06F 13/405* (2013.01); *G06F 13/4059* (2013.01); *G06F 13/4068* (2013.01); *G06F 13/4243* (2013.01); *G06F 13/4282* (2013.01)

(58) Field of Classification Search
CPC ............... G06F 13/4009; G06F 13/405; G06F 13/4068; G06F 13/4213; G06F 13/4217; G06F 13/4226; G06F 13/423; G06F 13/4239; G06F 13/4243; G06F 13/4282; G06F 5/06; G06F 5/065; G06F 13/4059; H04L 12/40058
See application file for complete search history.

(56) References Cited

U.S. PATENT DOCUMENTS

| | | | | |
|---|---|---|---|---|
| 5,559,796 A | * | 9/1996 | Edem ................... | H04J 3/0626 370/412 |
| 6,104,714 A | * | 8/2000 | Baudelot ............ | H04Q 11/0478 370/358 |
| 6,744,772 B1 | * | 6/2004 | Eneboe ................. | H04L 49/101 370/230 |

(Continued)

OTHER PUBLICATIONS

"Automotive Ethernet: An Overview". Revision A. May 2014. Ixia. (Year: 2014).*

*Primary Examiner* — Thomas J. Cleary
(74) *Attorney, Agent, or Firm* — Norton Rose Fulbright US LLP

(57) ABSTRACT

Isochronous channels may be used for transporting non-isochronous data between components in an electronic device, such as when non-isochronous data is aggregated from multiple non-isochronous data streams to achieve a high peak-to-average bandwidth. The aggregated non-isochronous data sources may include data streams from general-purpose communications interfaces for interconnecting components or sub-systems of components within an electronic device. For example, I2C networks for control and programming of components may be connected to other I2C networks through an isochronous channel, such as a differential pair of Soundwire SWI3S wires.

22 Claims, 7 Drawing Sheets

(56) References Cited

U.S. PATENT DOCUMENTS

| | | | | |
|---|---|---|---|---|
| 7,058,067 B1* | 6/2006 | Corley | ............. | H04L 29/06027 |
| | | | | 370/408 |
| 2005/0099383 A1* | 5/2005 | Nguyen | ............. | H04N 21/4341 |
| | | | | 345/156 |
| 2005/0198426 A1* | 9/2005 | Smyers | ............. | H04L 12/40058 |
| | | | | 710/305 |
| 2009/0024756 A1* | 1/2009 | Spalla | ................... | H04L 1/0057 |
| | | | | 709/231 |
| 2012/0281618 A1* | 11/2012 | Zheng | ................ | H04L 12/5601 |
| | | | | 370/328 |
| 2016/0269321 A1* | 9/2016 | Lee | ....................... | H04L 41/145 |
| 2017/0060794 A1* | 3/2017 | Zwart | ................... | G06F 13/405 |
| 2021/0034373 A1* | 2/2021 | Capalija | ................ | G06F 9/3005 |

* cited by examiner

COMMUNICATING NON-ISOCHRONOUS DATA OVER AN ISOCHRONOUS CHANNEL

CROSS-REFERENCE TO RELATED PATENT APPLICATIONS

This application claims the benefit of priority of U.S. Provisional Patent Application No. 62/897,508 filed on Sep. 9, 2019 and entitled "Method and Apparatus of Communicating Non-Isochronous Data Over an Isochronous Interface," which is hereby incorporated by reference in its entirety.

FIELD OF THE DISCLOSURE

The instant disclosure relates to communications devices. More specifically, portions of this disclosure relate to communicating over isochronous channels.

BACKGROUND

Isochronous data streams may be used for transporting audio data due to the generally constant nature of bandwidth in an audio data stream. Although isochronous data streams have advantages for constant bandwidth data, isochronous data streams have disadvantages when used to transport variable bandwidth data streams. Some components in an electronic device have both constant and variable bandwidth data streams for transmission to other components. For example, audio coder/decoders (CODECs) may have a variable bandwidth data stream from a control interface and a constant bandwidth audio data stream for input and output audio.

An isochronous channel may be used to transmit and receive data in an electronic device, and that isochronous channel may include embedded variable bandwidth data streams as a control data stream. In one conventional channel arrangement, the control data may have a fixed slot assignment having one or more bits that is transmitted with each row of constant bandwidth data. Overhead is embedded into the control data to allow its transport over an isochronous interface, such that the available bandwidth for the variable bandwidth data is lower than the bandwidth reserved on the interface for the control data. That is, a non-isochronous payload may take longer to transmit over the isochronous channel than a similar size chunk of isochronous data takes to be sent over an isochronous channel, even if the non-isochronous payload and the isochronous payload have the same bandwidth allocation on the channel.

Other characteristics of an isochronous channel may present challenges to the transport of variable bandwidth data. For example, isochronous channels may have a fixed bandwidth and sample delivery cadence, such that unused bandwidth is wasted when the variable bandwidth data decreases in bandwidth to less than the allocated bandwidth on an isochronous interface. The wasted bandwidth increases as the number of variable bandwidth data streams increases that are transmitted over the isochronous channel. Each variable bandwidth data stream must be assigned sufficient bandwidth to accommodate the peak bandwidth of the data stream, significantly reducing the bandwidth of the isochronous channel available to transport the isochronous data stream.

Shortcomings mentioned here are only representative and are included simply to highlight that a need exists for improved electrical components, particularly for using isochronous channels in consumer-level devices, such as mobile phones. Embodiments described herein address certain shortcomings but not necessarily each and every one described here or known in the art. Furthermore, embodiments described herein may present other benefits than, and be used in other applications than, those of the shortcomings described above.

SUMMARY

Isochronous channels may be useful for transporting non-isochronous data between components in an electronic device. For example, the isochronous channel may be useful when non-isochronous data is aggregated from multiple non-isochronous data streams to achieve a high peak-to-average bandwidth. The aggregated non-isochronous data sources may include data streams from general-purpose communications interfaces for interconnecting components or sub-systems of components within an electronic device. Embodiments of the present disclosure allow multiple non-isochronous interfaces to share one or more isochronous channels, such as a combination of Soundwire SWI3S wires, such that components coupled to the non-isochronous interfaces effectively use the isochronous transports of the SWI3S wires. For example, I2C networks for control and programming of components may be connected to other I2C networks through an isochronous channel, such as a differential pair of Soundwire SWI3S wires.

A bridge chip may be coupled to the isochronous channel and couple non-isochronous interfaces to the isochronous channel. In some embodiments, a host bridge chip may be coupled to an applications processor of a mobile device and slave bridge chips may be coupled to a microphone, analog-to-digital converter (ADC), digital-to-analog converter (DAC), amplifier, digital signal processor (DSP), and/or (CODEC) within the mobile device. The bridge chips within the electronic device couple the components to the isochronous channel.

In some embodiments, audio metadata may be transported through the improved communications systems to audio components with non-isochronous interfaces. Example electronic devices with audio components that may benefit from these communications techniques include music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like.

According to one embodiment, a method for communicating between components of an electronic device includes receiving a first data stream from a first component of an electronic device, the first data stream comprising first non-isochronous data having a second component of the electronic device as a destination; packaging the first non-isochronous data of the first data stream into first packaged data for transport over an isochronous channel; and/or transmitting the first packaged data over the isochronous channel to the second component.

In certain embodiments, the method may include receiving data for the first component through the isochronous channel. The method for communicating may thus also include receiving second packaged data through the isochronous channel from the second component; extracting second non-isochronous data from the second packaged data; and/or transmitting the second non-isochronous data in a second data stream to the first component.

In certain embodiments, the method may include coupling the isochronous channel to multiple non-isochronous data streams to support multiple components at an endpoint of the isochronous channel. The method for communicating may thus also include receiving a second data stream from a third component of the electronic device, the second data stream comprising second non-isochronous data having a fourth component as a destination; packaging the second non-isochronous data of the second data stream into second packaged data for transport over the isochronous channel; and/or transmitting the second packaged data over the isochronous channel to the fourth component.

In certain embodiments, data to and/or from one or more components coupled to an isochronous channel may be buffered from the one or more components before being transmitted across the isochronous channel. The method for communicating may thus also include buffering the first data stream in a first memory, wherein packaging the first non-isochronous data of the first data stream into first packaged data comprises retrieving the first data stream from the first memory; and/or buffering the second data stream in a second memory, wherein packaging the second non-isochronous data of the second data stream into second packaged data comprises retrieving the second data stream from the second memory. Data from the buffers may be selected for transport over the isochronous channel based on predetermined conditions, such as amounts of data in the buffers. The method for communicating may thus also include determining a first amount of data in the first memory; determining a second amount of data in the second memory; and/or determining to transmit the first data stream over the isochronous channel based on the first amount of data and the second amount of data (such as based on when the first amount of data is larger than the second amount of data), wherein the packaging of the first non-isochronous data of the first data stream into first packaged data and the transmitting of the first packaged data over the isochronous channel are performed in response to determining to transmit the first data stream.

In certain embodiments, identifying semaphore characters may be used to uniquely identify a source of data on the isochronous channel and also used to identify a destination component for the data. The method for communicating may thus also include transmitting a first identifying semaphore character over the isochronous channel prior to transmitting the first packaged data over the isochronous channel, wherein the first identifying semaphore character comprises a symbol associated with the first component; and/or transmitting a second identifying semaphore character over the isochronous channel prior to transmitting the second packaged data over the isochronous channel to the fourth component, wherein the second identifying semaphore character comprises a second symbol associated with the third component.

In certain embodiments, audio metadata may be transported over the isochronous channel. The method for communicating may thus also include receiving a second data stream from a third component of the electronic device, the second data stream comprising second non-isochronous data having a fourth component as a destination, wherein the second non-isochronous data comprises audio metadata, wherein the third component is an audio component, and wherein the fourth component is an audio component; packaging the second non-isochronous data of the second data stream into second packaged data for transport over the isochronous channel; and/or transmitting the second packaged data over the isochronous channel to the fourth component, wherein the third component comprises an input clock, and wherein the fourth component comprises an output clock, and wherein the audio metadata comprises an indication that the input clock of the third component is static, and wherein the method comprises when the input clock of the third component is static, stopping the output clock of the fourth device.

According to another embodiment, an apparatus may include a memory coupled to a processor, wherein the processor is configured to perform any of the operations described above. One or more of a processor and/or a memory may be formed in an integrated circuit (IC) and included in a bridge chip used in an electronic device to couple components of the electronic device through an isochronous channel.

According to another embodiment, a computer program product may include a non-transitory computer readable medium including code to perform any of the operations described above. The computer program product may be a read-only memory (ROM), flash memory, or other memory device that stores computer code that causes the processor of an electronic device to perform any of the operations described above.

According to another embodiment, an electronic device may include an isochronous channel; a first communications bridge configured to communicate on the isochronous channel; a first component local to the first communications bridge and coupled to the first communications bridge; a second communications bridge configured to communicate with the first communications bridge through the isochronous channel; and/or a second component remote from the first communications bridge and coupled to the second communications bridge, wherein the first communications bridge and/or the second communications bridge are configured to perform any of the operations described above.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Embodiments of the present disclosure enable multiple components with non-isochronous interfaces to share one or more isochronous channel for communications between the components. In some embodiments, the multiple non-isochronous interfaces may be general-purpose interfaces being aggregated to obtain a high peak-to-average bandwidth characteristic for data on the isochronous channel. In some embodiments, the non-isochronous interfaces may carry control and programming data for I2C and/or UART communications. In some embodiments, the sharing of an isochronous channel may be used for interconnecting components within audio components within an electronic device.

Figure 1:
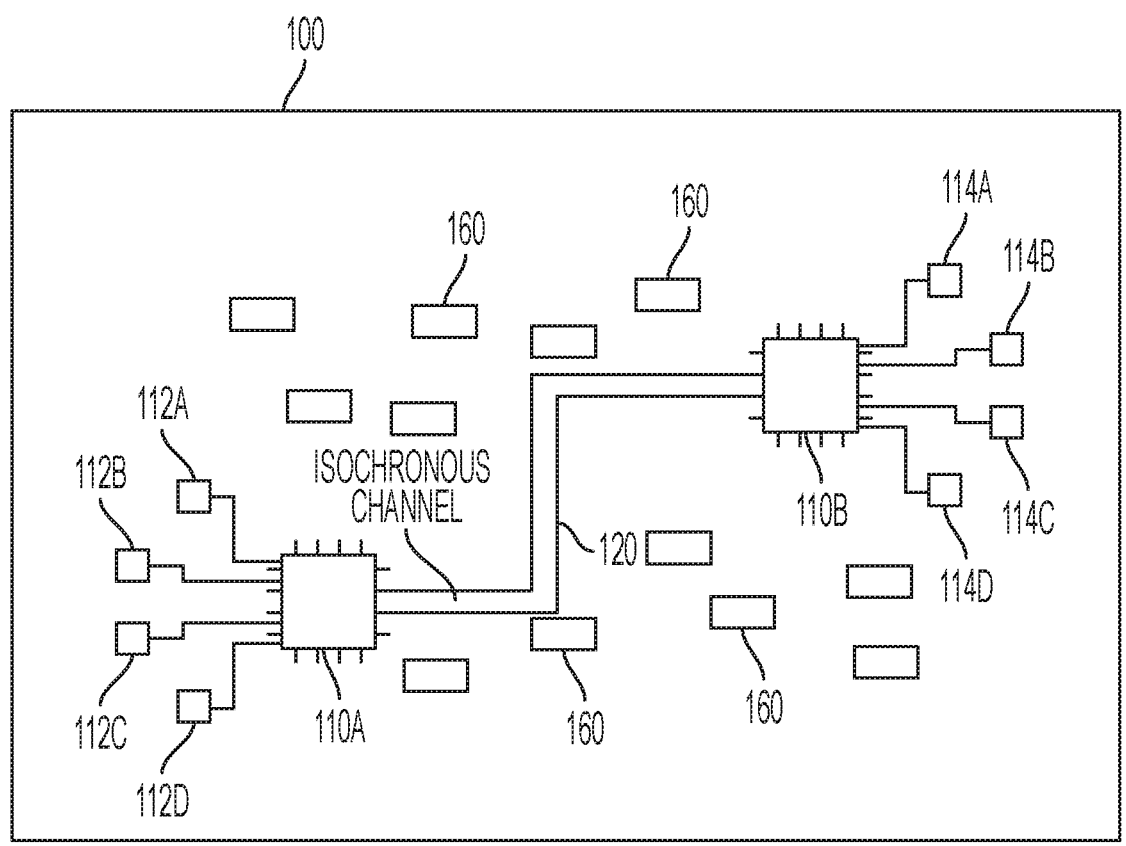
FIG. 1 is a block diagram illustrating the use of an isochronous channel to connect two components of an electronic device according to some embodiments of the disclosure.

FIG. 1 is a block diagram illustrating the use of an isochronous channel to connect two components of an electronic device according to some embodiments of the disclosure. A printed circuit board (PCB) 100 of an electronic device may include a first set of components 112A-D and a second set of components 114A-D. The two sets of components may be physically separated from each other by a large distance on the PCB 100. For example, the two sets may be separated by other components 160 such that components in the two sets are not neighboring components on the PCB 100. As another example, the two sets may be located at opposite ends of the PCB 100. As a further example, the two sets may be connected as separate I2C networks regardless of their location on the PCB 100. The first set 112 and the second set 114 of components may communicate through an isochronous channel 120 coupling the components 112A-D to the components 114A-D. The isochronous channel 120 may be, for example, a SoundWire I3S (a.k.a., "SWI3S") channel, which is a standard for transporting isochronous data (e.g., data with a consistent bandwidth and sample rate).

Bridge chips 110A and 110B may provide an interface between the various interfaces of the components 112A-D and 114A-D and the isochronous channel 120. For example, the bridge chip 110A may accumulate non-isochronous data from components 112A-D for communication over the isochronous channel 120. Likewise, the bridge chip 110B may accumulate non-isochronous data from components 114A-D for communication over the isochronous channel 120. The isochronous channel 120 may be a differential pair of conductors embedded in the PCB 100. The operation of the bridge chips 110A-B for interfacing non-isochronous data with an isochronous channel is described with more reference to FIG. 2.

Figure 2:
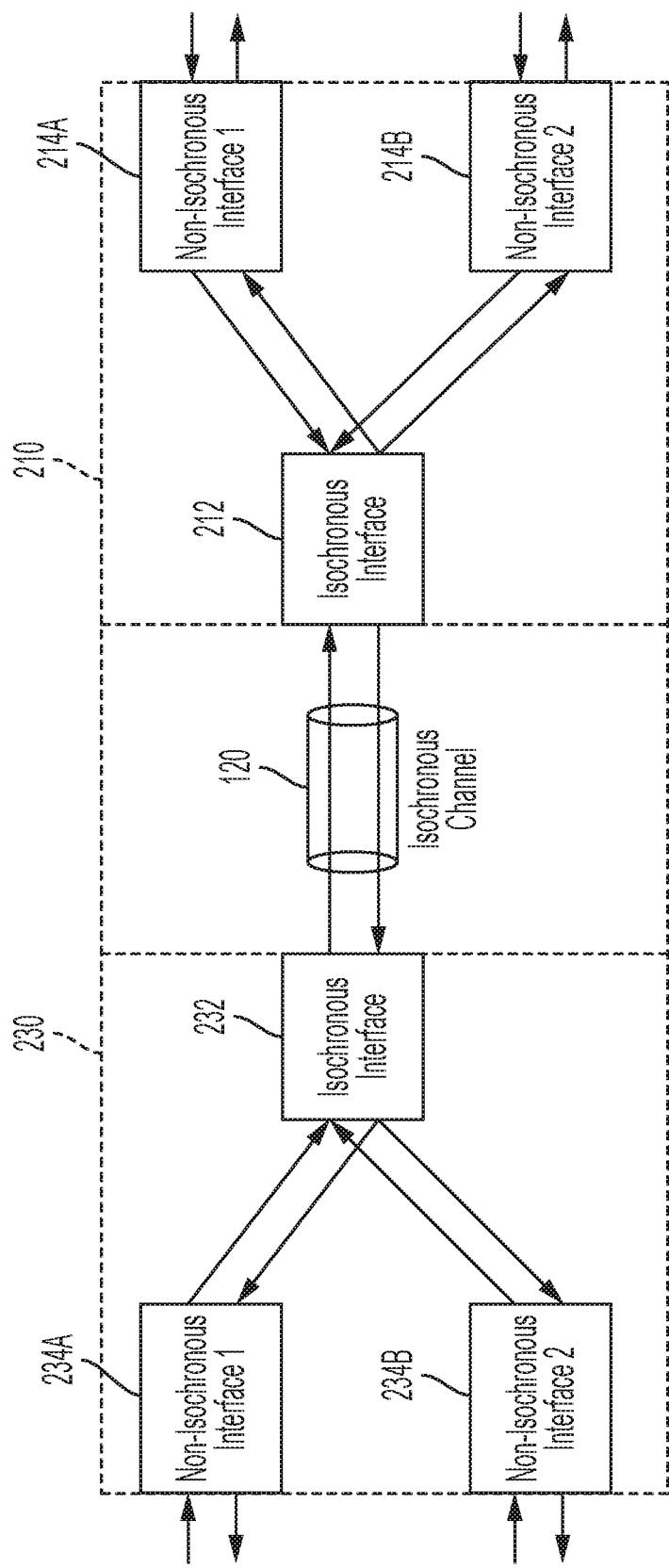
FIG. 2 is a block diagram illustrating interfacing of an isochronous channel with non-isochronous interfaces according to some embodiments of the disclosure.

FIG. 2 is a block diagram illustrating interfacing of an isochronous channel with non-isochronous interfaces according to some embodiments of the disclosure. The isochronous channel 120 may couple at each end to isochronous interfaces 212 and 232 of communication bridges 210 and 230. The isochronous interfaces 212 and 232 may receive data from non-isochronous interfaces 214A-B and 234A-B, respectively. The non-isochronous interfaces 214A-B and 234A-B may receive data from components of an electronic device that have variable bandwidth data streams, such as an audio data control stream from an audio component. For example, the non-isochronous data may include general-purpose input/output such as Inter-Integrated Circuit (I2C) or Universal Asynchronous Receiver-Transmitter (UART) data received from components on either side of the isochronous channel 120. The isochronous interfaces 212 and 232 receive data from the non-isochronous interfaces 214A-B and 234A-B and package the data as an isochronous data stream suitable for the isochronous channel 120. The packaging operation may include formatting variable bandwidth data as constant bandwidth data, such as by inserting null symbols to increase the variable bandwidth data to reach a predetermined constant bandwidth for the isochronous channel 120. In some embodiments, the isochronous channel 120 may transport only non-isochronous data streams. Additionally, the isochronous channel 120 may carry control data for the bridge chips 110A-B. For example, I2C commands may be carried from a master bridge chip to a slave bridge chip. Such control data has a destination of the bridge chip itself, rather than a component coupled to one of the interfaces 214A-B or 234A-B. In some embodiments, the bridge chip control data may include register read/write commands for setting configuration registers of the bridge chip.

The functionality described in FIG. 2 may be incorporated into ICs as individual chips within an electronic device. For example, the isochronous interface 232, along with the non-isochronous interfaces 234A-B and logic circuitry for performing the packaging of the non-isochronous data may be integrated into a chip, such as the bridge chips 110A-B of FIG. 1. Although an isochronous channel with two non-isochronous interfaces on each end is shown in FIG. 2, other configurations are possible including more or less non-isochronous interfaces on each end of the channel 120 and/or a different number of non-isochronous interfaces on each end of the channel 120. In some embodiments, the bridge chips 110A-B may include other functionality, such as FIFO buffers, arbiters, and/or data ports as shown in more detail in FIG. 3.

Figure 3:
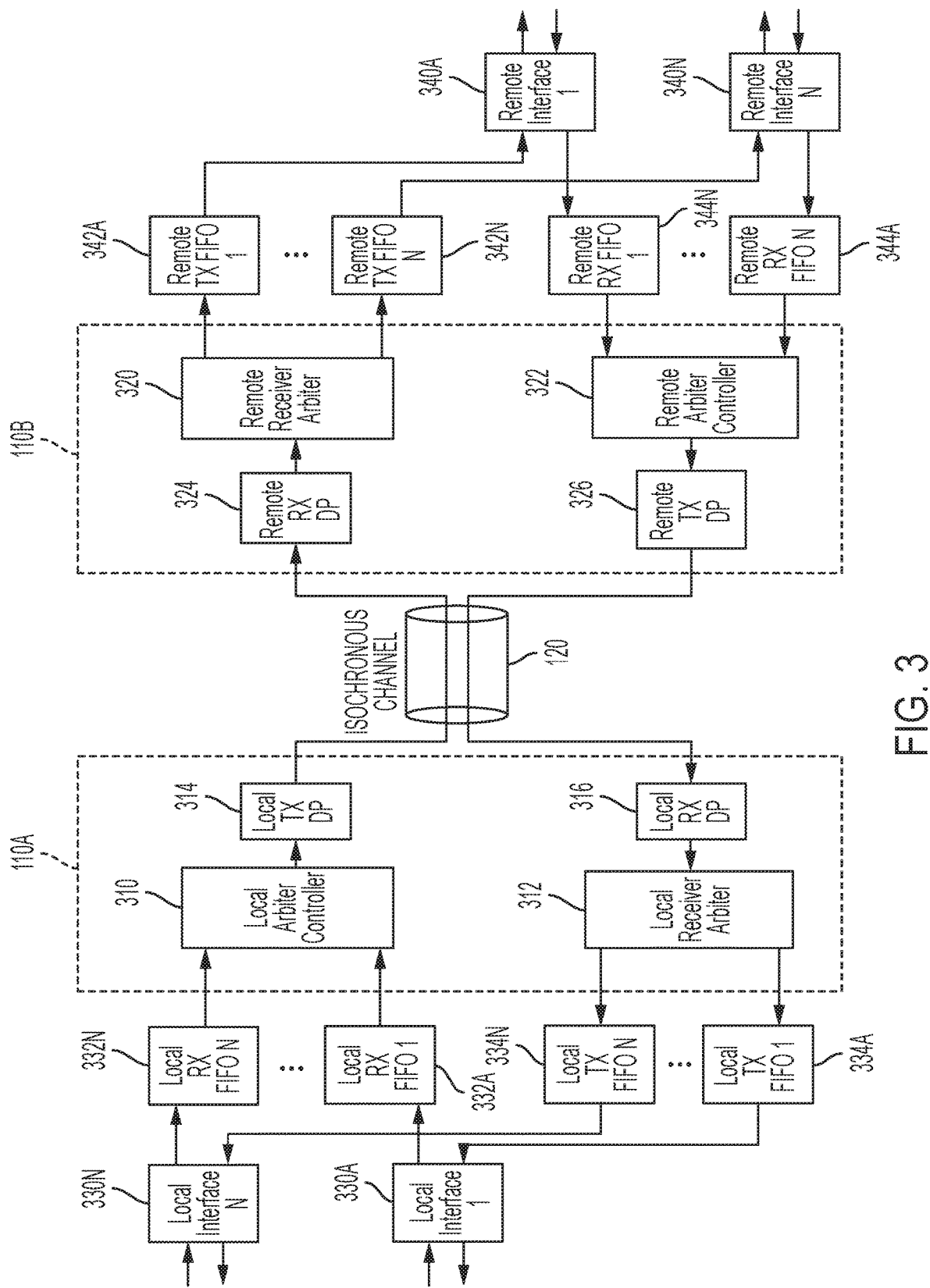
FIG. 3 is a block diagram illustrating operation of bridge chips for interfacing components to an isochronous channel according to some embodiments of the disclosure.

FIG. 3 is a block diagram illustrating operation of bridge chips for interfacing components to an isochronous channel according to some embodiments of the disclosure. The isochronous channel 120 may couple dataports on a local side and a remote side of the channel 120. A local side of the channel 120 may include local transmit (TX) dataport 314 and local receive (RX) dataport 316 coupled to a corresponding remote receive (RX) dataport 324 and remote transmit (TX) dataport 326 of a remote side of the channel 120. The dataports 314, 316, 324, and 326 may be circuitry configured to perform the layer one (L1) signaling on the isochronous channel 120. On the local side, a local arbiter controller 310 may couple several local RX first-in-first-out (FIFOs) 332A-N to the TX dataport 314 and a local receiver arbiter 312 may couple the RX dataport 316 to several local TX first-in-first-out (FIFOs) 334A-N. Pairs of FIFO buffers, each pair including a local RX FIFO buffer and a local TX FIFO buffer, provide two-way communications through local interfaces 330A-N to components on the local side of the isochronous channel 120. Although each local interface 330A-N is shown coupled to both a RX and a TX FIFO, some local interfaces may be one-way interfaces coupled only to one of a RX FIFO or a TX FIFO. Further, although FIFO buffers are shown, other memory structures, such as last-in-first-out (LIFO) buffers or cache memory, may be used to store data between the local interfaces 330A-N and the local arbiter controller 310 and the local receiver arbiter 312.

A remote side of the isochronous channel 120 may include similar functionality as the local side. On the remote side, remote RX and TX dataports 324 and 326 provide physical layer (e.g., layer one) signaling on the isochronous channel 120. Also on the remote side, remote receiver arbiter 320, remote arbiter controller 322, remote TX FIFOs 342A-N, and remote RX FIFOs 344A-N function to provide a data path from remote interfaces 340A-N to isochronous channel 120. Although the remote side is shown as a mirror of the local side, there may be a different number of remote interfaces 340A-N and other components on the remote side.

Operation on each of the local and remote sides of the isochronous channel 120 may be managed by the arbiters 310, 312, 320, and 322 to provide reliable communication over the isochronous channel 120 for components coupled to the local interfaces 330A-N and the remote interfaces 340A-N. A local general-purpose interface, e.g., local interface 330A, receives data in its specific format and protocol. The received data is placed in a local RX FIFO 332A. There may be one local RX FIFO for each general-purpose interface. For example, there may be a plurality of local RX FIFOs 332A-N corresponding to a plurality of local interfaces 330A-N. A controller, e.g., local arbiter controller 310, monitors the amount of data queued in each local RX FIFO 352A-N. The local arbiter controller 310 determines one RX FIFO of the plurality of RX FIFOs 352A-N to be the active transmit FIFO. Upon determining the active transmit FIFO, the local arbiter controller 310 provides an identifying semaphore character to the TX dataport 314 for transmission over the isochronous channel 120. Following the identifying semaphore character, the local arbiter controller provides one or more samples of encoded data from the active transmit FIFO to the TX dataport 314.

Communications involving the active transmit FIFO may continue until a predetermined condition change occurs, such as a change in the relative size of queued data at each FIFO. As the local arbiter controller 310 provides encoded data to the TX dataport 314, less data is queued in the active transmit FIFO. The local arbiter controller 310 continues to monitor the amount of data queued in each RX FIFO 332A-N and determines one FIFO of the plurality of FIFOs 332A-N to be the active transmit FIFO. In some embodiments, a priority may be assigned to the different non-isochronous data sources, which may be used to determine the active transmit FIFO alone or in combination with the amount of queued data. The previously-selected active transmit FIFO and the newly-selected active transmit FIFO may be the same FIFO or may be different FIFOs. If the previously-selected active transmit FIFO and the newly-selected active transmit FIFO are the same FIFO, then the local arbiter controller 310 may selectively choose to omit the identifying semaphore character and instead continue to provide one or more samples of encoded data from the active transmit FIFO to the TX dataport 314. If the previously-selected active transmit FIFO and the newly-selected active transmit FIFO are different, or if the local arbiter controller selectively chooses to re-transmit the identifying semaphore character, then the local arbiter controller 310 provides an identifying semaphore character to the TX dataport 314. The local arbiter controller may determine to re-transmit the identifying semaphore character periodically when the previously-selected active transmit FIFO and the newly-selected active transmit FIFO are the same FIFO because this allows a remote receiver arbiter 320 on a receiving-side of the isochronous channel 120 to re-synchronize with the local arbiter controller 310, such as after a transmission error. The identifying semaphore character may include a symbol associated with the component that is coupled to the active transmit FIFO such that the remote receiver arbiter 320 can route the data to a corresponding one of the remote interfaces 340A-N.

Communications involving the active transmit FIFO may also continue until the active transmit FIFO runs out of queued data. The active transmit FIFO may run out of queued data before the local arbiter controller 310 selects a new active transmit FIFO. If the active transmit FIFO runs out of queued data before the local arbiter controller 310 selects a new active transmit FIFO, the local arbiter controller 310 may provide an identifying semaphore character to the TX dataport 314. The identifying semaphore character provided when the active transmit FIFO runs out of queued data may be identical to the identifying semaphore character provided when the active transmit FIFO was selected by the local arbiter controller 310 or may be a unique semaphore indicating an empty transmit FIFO condition. Other events may also interrupt communications involving the active transmit FIFO, such as interrupts or other predetermined conditions.

Dataports are used to generate the physical signaling on a channel, any may include circuitry for generating signals on the channel and processing signals received on the channel. The local TX dataport 314 transmits all data symbols and identifying semaphore characters provided by the local arbiter controller 310 from the active transmit FIFIO at an isochronous rate, e.g., at a continuous sample rate, on the isochronous channel 120. The local RX dataport 316 receives isochronous samples from the isochronous channel 120 and provides each sample to a local receiver arbiter 312. When a sample is provided to the local receiver arbiter 312, the local receiver arbiter 312 may determine if the sample is a valid identifying semaphore character. If the sample is a valid identifying semaphore character, the local receiver arbiter 312 may determine an action, if any, to perform based on a context and the active receive FIFO. If the valid identifying semaphore character indicates a selection of a TX FIFO, then the local receiver arbiter 312 may set the active receive FIFO to the indicated TX FIFO. If the valid identifying semaphore character indicates an empty transmit FIFO condition, the local receiver arbiter 312 may perform no action.

When a sample is provided to the local receiver arbiter 312, the local receiver arbiter 312 may determine if the sample is valid encoded data. If the sample is valid encoded data, the local receiver arbiter 312 provides decoded data to the active receive FIFO. If the sample is an invalid character, such as when the character is determined to not be a valid identifying semaphore character and not a valid encoded data character, the local receiver arbiter 312 may enter an error context. While the local receive arbiter 312 is in the error context, no decoded data may be provided to local transmit FIFOs 334A-N. The local receiver arbiter 312 exits the error context when a sample is determined to be a valid identifying semaphore character that indicates a selection of one of the FIFOs 334A-N. In response, the local receiver arbiter 312 then sets the active receive FIFO to the indicated local FIFO and provides decoded data received through the isochronous channel 120. The local interfaces 330A-N monitors a corresponding one of the local TX FIFOs 334A-N. If the corresponding TX FIFO is empty, then the local interface 330 may perform no action. If the TX FIFO 334A is not empty, then the local interface 330A may transmit data from the TX FIFO 334A in a format and protocol specified for the local interface 330A. The remote receiver arbiter 320 and remote arbiter controller 322 operate similarly to the local receiver arbiter 312 and the local arbiter controller 310, respectively, but are coupled to the remote dataports 324 and 326 and remote TX FIFOs 342A-N and remote RX FIFOs 344A-N.

Figure 4:
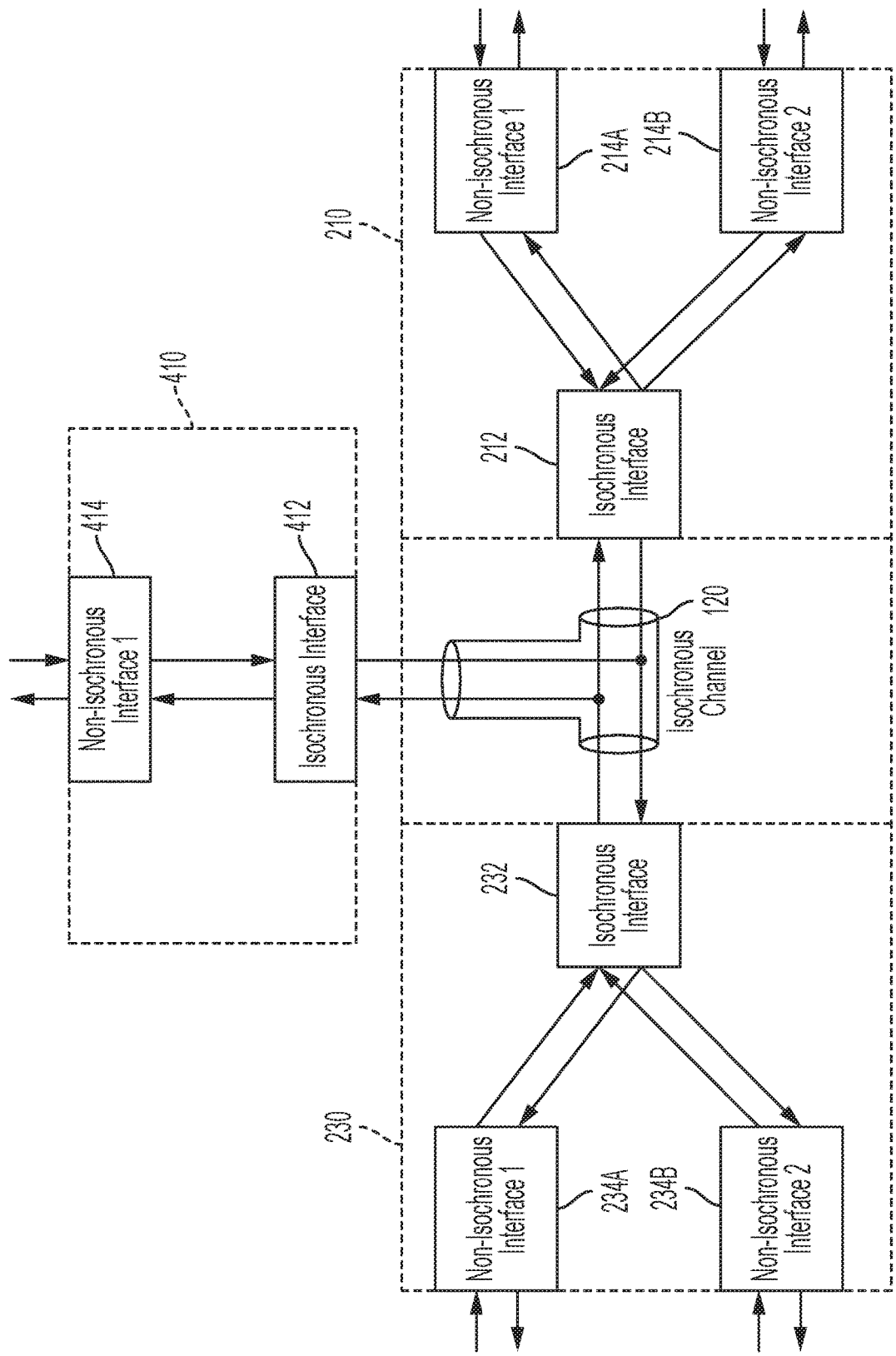
FIG. 4 is a block diagram illustrating interfacing of an isochronous channel with multiple endpoints with non-isochronous interfaces according to some embodiments of the disclosure.

The isochronous channel 120 is not limited to a two-endpoint channel but may include additional endpoints coupled to other components at other locations in an electronic device. FIG. 4 is a block diagram illustrating interfacing of an isochronous channel with multiple endpoints with non-isochronous interfaces according to some embodiments of the disclosure. A third communications bridge 410 may couple a non-isochronous interface 414 to a third component with isochronous interface 412 for communicating on the isochronous channel 120. The third component may transmit data to components coupled to the communications bridges 210 and 230. The bridges 230 and 210 may receive the data from the bridge 410 along with signaling to identify which of the non-isochronous interfaces 234A-B and 214A-B to use for transmitting the data.

Figure 5:
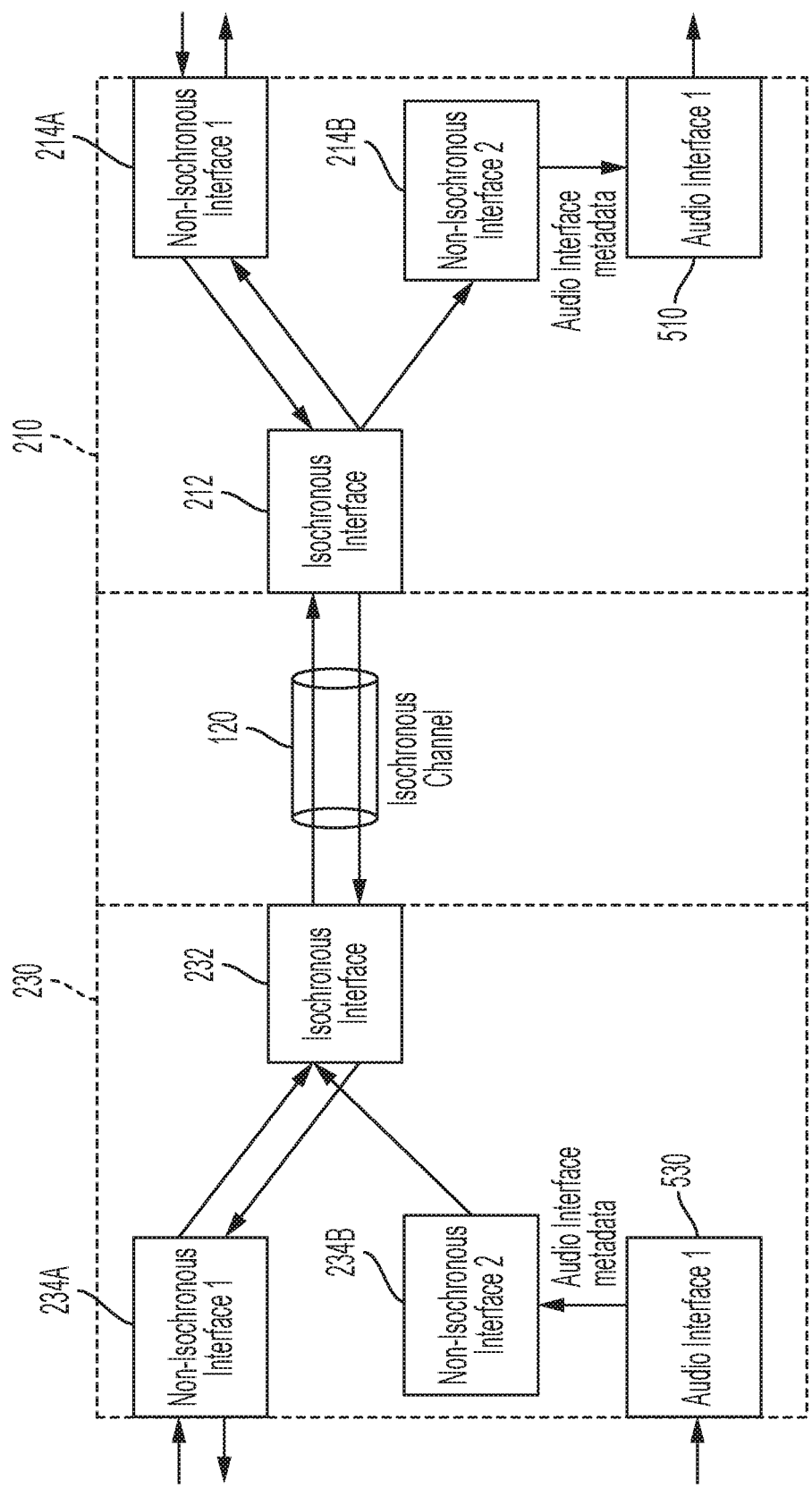
FIG. 5 is a block diagram illustrating interfacing of an isochronous channel with audio interfaces having non-isochronous interfaces according to some embodiments of the disclosure.

In some embodiments, the non-isochronous interfaces may provide interfaces for audio metadata to be transmitted over the isochronous channel 120. FIG. 5 is a block diagram illustrating interfacing of an isochronous channel with audio interfaces having non-isochronous interfaces according to some embodiments of the disclosure. The non-isochronous interface 234B may be coupled to an audio interface 530 to receive audio interface metadata from the audio interface 530. Upon transmission of the audio metadata over the isochronous channel 120, the communications bridge 210 may provide the audio metadata to audio interface 510, such as through non-isochronous interface 214B.

In some embodiments, the audio interface 530 may have or receive an input clock, and an indication of that clock may be provided over the isochronous channel 120 to be processed by audio interface 510 to generate an output clock. In some embodiments, the indication contained in the audio metadata may indicates that the input clock of the audio interface 530 is static and, when the input clock of the audio interface 530 is static, the output clock of the audio interface 510 then terminates. The termination of the audio clock may also result in the termination of audio data and the end of audio playback. Generally, audio metadata may include additional non-audio data that is related to the audio data, such as data that may control playback or other processing of the audio data.

Figure 6:
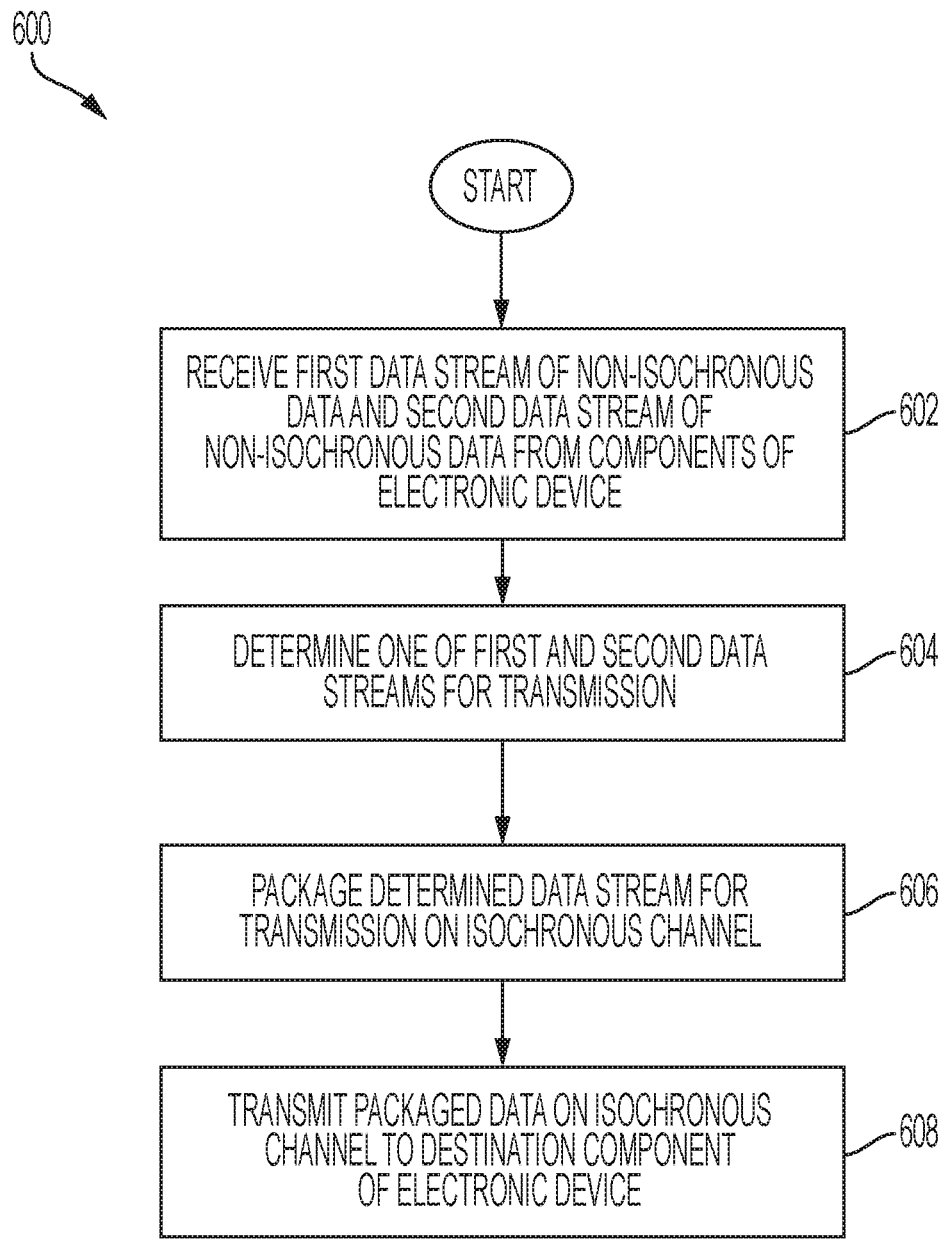
FIG. 6 is a flow chart illustrating a method of communicating non-isochronous data over an isochronous channel according to some embodiments of the disclosure.

A method for communicating over an isochronous channel is described with reference to FIG. 6. FIG. 6 is a flow chart illustrating a method of communicating non-isochronous data over an isochronous channel according to some embodiments of the disclosure. A method 600 begins at block 602 with receiving first and second data streams of non-isochronous data from components of an electronic device. At block 604, one of the first and second data streams is determined for transmission over the isochronous channel. At block 606, data from the determined data stream is packaged as isochronous data for transmission over the isochronous channel. At block 608, the packaged data is transmitted on the isochronous channel to a destination component of the electronic device. In some embodiments, each of the data streams received at block 602 is mapped to destination components with an identifying semaphore character included in the data stream to associate data in the data stream with source components such that destination components may be determined.

Figure 7:
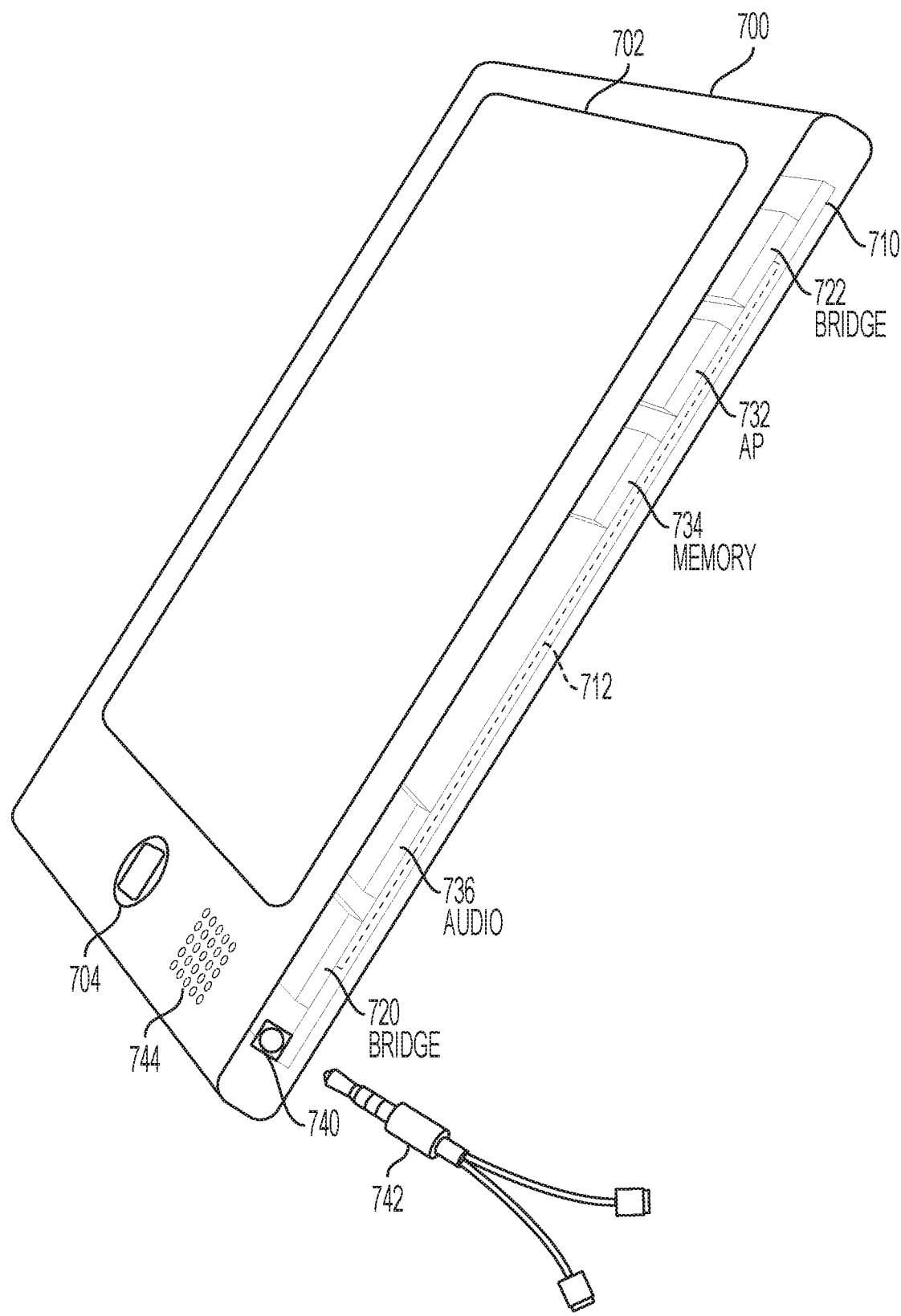
FIG. 7 is an illustration showing an example mobile device for audio playback including an isochronous channel according to one embodiment of the disclosure.

An isochronous channel may be used for communicating non-isochronous data, including general purpose input/output data and audio metadata, in a variety of electronic devices, such as portable media players, cell phones, laptop computers, stereo systems, and other devices that convert stored audio data into an audio output. One advantageous embodiment for isochronous channel communication is a mobile device for playing back music, high-fidelity music, and/or speech from telephone calls. FIG. 7 is an illustration showing an example mobile device for audio playback including an isochronous channel according to one embodiment of the disclosure. A mobile device 700 may include a display 702 for allowing a user to provide user input to the mobile device 700. One or more physical buttons 704 may also allow a user to provide user input to the mobile device 700. The mobile device 700 may also include a printed circuit board (PCB) 710 interconnecting components that provide the functionality of mobile device 700. For example, an application processor (AP) 732, memory 734, and audio 736 components may be attached to the PCB 710. Communications between the components may be provided through an isochronous channel 712 formed as a differential pair of conductors on or in the PCB 710. Communication bridge chips 720 and 722 coupled to endpoints of the isochronous channel 712 may include processing and memory circuitry that provide non-isochronous interfaces for receiving non-isochronous data from components 732, 734, and 736 and packaging the non-isochronous data for transmission on the isochronous channel 712. The audio component 736 may provide an audio output signal to a headphone jack 740, for driving a transducer, such as headphones 742. The audio component 736 may also be coupled to an internal speaker 744. The audio component 736 may provide signal processing, digital-to-analog conversion (DAC), filtering, and/or amplification to audio files received from memory 734 for output to a user. Although the data received at the audio component 736 is described as received from memory 734, the audio data may also be received from other sources, such as a USB connection, a device connected through Wi-Fi to the mobile device 700, a cellular radio, an Internet-based server, another wireless radio, and/or another wired connection.

In some embodiments, the bridge chips 720 and 722 may be configured in a master-slave arrangement. For example, a host bridge chip 722 may be coupled to the AP 732 of mobile device 700 and slave bridge chip 720 may be coupled to a microphone, analog-to-digital converter (ADC), digital-to-analog converter (DAC), amplifier, digital signal processor (DSP), and/or (CODEC) within the mobile device. Embodiments of the present disclosure are useful for SWI3S-based sub-systems within audio-enabled equipment. For example, multiple slave bridge chips may each individually be coupled to separate components, such as a microphone, speaker, and DAC, allowing the AP to communicate to the components through a single differential wired bus.

The operations described above as performed by processing circuitry may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

The described methods are generally set forth in a logical flow of steps. As such, the described order and labeled steps of representative figures are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processing of audio data is described in some examples above, other data may be processed as described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
receiving a first data stream from a first component of a mobile device, the first data stream comprising first non-isochronous data having a first variable bandwidth, the first non-isochronous data having a second component of the mobile device as a destination;
packaging the first non-isochronous data of the first data stream into first packaged data for transport over an isochronous channel;
receiving a second data stream from a third component of the mobile device, the second data stream comprising second non-isochronous data having a second variable bandwidth, the second non-isochronous data having a fourth component as a destination;
packaging the second non-isochronous data of the second data stream into second packaged data for transport over the isochronous channel; and
transmitting the first packaged data and the second packaged data at a constant bandwidth by inserting null symbols in the first packaged data and the second packaged data over the isochronous channel, wherein the first packaged data and the second packaged data are selected for transmission over the isochronous channel based on a priority of the first component and the second component, respectively.

2. The method of claim 1, further comprising:
receiving second packaged data through the isochronous channel from the second component;
extracting second non-isochronous data from the second packaged data; and
transmitting the second non-isochronous data in a second data stream to the first component.

3. The method of claim 1, further comprising:
buffering the first data stream in a first memory, wherein packaging the first non-isochronous data of the first data stream into first packaged data comprises retrieving the first data stream from the first memory; and
buffering the second data stream in a second memory, wherein packaging the second non-isochronous data of the second data stream into second packaged data comprises retrieving the second data stream from the second memory.

4. The method of claim 3, further comprising:
determining a first amount of data in the first memory;
determining a second amount of data in the second memory; and
determining to transmit the first data stream over the isochronous channel based on the first amount of data and the second amount of data,
wherein the packaging of the first non-isochronous data of the first data stream into first packaged data and the transmitting of the first packaged data over the isochronous channel are performed in response to determining to transmit the first data stream.

5. The method of claim 1, further comprising:
transmitting a first identifying semaphore character over the isochronous channel prior to transmitting the first packaged data over the isochronous channel, wherein the first identifying semaphore character comprises a symbol associated with the first component; and
transmitting a second identifying semaphore character over the isochronous channel prior to transmitting the second packaged data over the isochronous channel to the fourth component, wherein the second identifying semaphore character comprises a second symbol associated with the third component.

6. The method of claim 1, further comprising:
receiving a second data stream from a third component of the mobile device, the second data stream comprising second non-isochronous data having a fourth component as a destination, wherein the second non-isochronous data comprises audio metadata, wherein the third component is an audio component, and wherein the fourth component is an audio component;
packaging the second non-isochronous data of the second data stream into second packaged data for transport over the isochronous channel; and
transmitting the second packaged data over the isochronous channel to the fourth component.

7. The method of claim 6, wherein the third component comprises an input clock, and wherein the fourth component comprises an output clock, and wherein the audio metadata comprises an indication that the input clock of the third component is static, and wherein the method comprises when the input clock of the third component is static, stopping the output clock of the fourth device.

8. The method of claim 1, wherein transmitting the first packaged data over the isochronous channel to the second component comprises transmitting the first packaged data over a differential pair of conductors of a printed circuit board coupling the first component to the third component.

9. The apparatus of claim 1, wherein the mobile device comprises a mobile phone.

10. An apparatus, comprising:
a memory;
a bridge chip coupled to the memory, the bridge chip comprising logic circuitry configured to perform steps comprising:
  receiving a first data stream from a first component of a mobile device, the first data stream comprising first non-isochronous data having a first variable bandwidth, the first non-isochronous data having a second component of the mobile device as a destination;
  packaging the first non-isochronous data of the first data stream into first packaged data for transport over an isochronous channel;
  receiving a second data stream from a third component of the mobile device, the second data stream comprising second non-isochronous data having a second variable bandwidth, the second non-isochronous data having a fourth component as a destination;
  packaging the second non-isochronous data of the second data stream into second packaged data for transport over the isochronous channel; and
  transmitting the first packaged data and the second packaged data at a constant bandwidth by inserting null symbols in the first packaged data and the second packaged data over the isochronous channel, wherein the first packaged data and the second packaged data are selected for transmission over the isochronous channel based on a priority of the first component and the second component, respectively.

11. The apparatus of claim 10, wherein the bridge chip is further configured to perform steps comprising:
receiving second packaged data through the isochronous channel from the second component;
extracting second non-isochronous data from the second packaged data; and
transmitting the second non-isochronous data in a second data stream to the first component.

12. The apparatus of claim 10, wherein the bridge chip is further configured to perform steps comprising:
buffering the first data stream in a first memory of the memory, wherein packaging the first non-isochronous data of the first data stream into first packaged data comprises retrieving the first data stream from the first memory; and
buffering the second data stream in a second memory of the memory, wherein packaging the second non-isochronous data of the second data stream into second packaged data comprises retrieving the second data stream from the second memory.

13. The apparatus of claim 12, wherein the bridge chip is further configured to perform steps comprising:
determining a first amount of data in the first memory;
determining a second amount of data in the second memory; and
determining to transmit the first data stream over the isochronous channel based on the first amount of data and the second amount of data,
wherein the packaging of the first non-isochronous data of the first data stream into first packaged data and the transmitting of the first packaged data over the isochronous channel are performed in response to determining to transmit the first data stream.

14. The apparatus of claim 10, wherein the bridge chip is further configured to perform steps comprising:
transmitting a first identifying semaphore character over the isochronous channel prior to transmitting the first packaged data over the isochronous channel, wherein the first identifying semaphore character comprises a symbol associated with the first component; and
transmitting a second identifying semaphore character over the isochronous channel prior to transmitting the second packaged data over the isochronous channel to the fourth component, wherein the second identifying semaphore character comprises a second symbol associated with the third component.

15. The apparatus of claim 10, wherein the bridge chip is further configured to perform steps comprising:
receiving a second data stream from a third component of the mobile device, the second data stream comprising second non-isochronous data having a fourth component as a destination, wherein the second non-isochronous data comprises audio metadata, wherein the third component is an audio component, and wherein the fourth component is an audio component;
packaging the second non-isochronous data of the second data stream into second packaged data for transport over the isochronous channel; and
transmitting the second packaged data over the isochronous channel to the fourth component.

16. The apparatus of claim 15, wherein the third component comprises an input clock, and wherein the fourth component comprises an output clock, and wherein the audio metadata comprises an indication that the input clock of the third component is static, and wherein the method comprises stopping the output clock of the fourth device when the input clock of the third component is static.

17. The apparatus of claim 10, wherein the bridge chip is configured to couple to a differential pair of conductors of a printed circuit board for coupling the first component to the third component.

18. A mobile device, comprising:
a printed circuit board comprising an isochronous channel;
a first communications bridge chip on the printed circuit board configured to communicate on the isochronous channel;
a first component on the printed circuit board local to the first communications bridge and coupled to the first communications bridge;
a third component on the printed circuit board local to the first communications bridge and coupled to the first communications bridge;
a second communications bridge chip on the printed circuit board configured to communicate with the first communications bridge through the isochronous channel;
a second component on the printed circuit board remote from the first communications bridge and coupled to the second communications bridge;
a fourth component on the printed circuit board remote from the first communications bridge and coupled to the second communications bridge,
wherein the first communications bridge is configured to perform steps comprising:
receiving a first data stream from the first component, the first data stream comprising first non-isochronous data having a first variable bandwidth, the first non-isochronous data having the second component of the mobile device as a destination;
packaging the first non-isochronous data of the first data stream into first packaged data for transport over the isochronous channel;
receiving a second data stream from the third component of the mobile device, the second data stream comprising second non-isochronous data having a second variable bandwidth, the second non-isochronous data having the fourth component as a destination;
packaging the second non-isochronous data of the second data stream into second packaged data for transport over the isochronous channel; and
transmitting the first packaged data and the second packaged data at a constant bandwidth by inserting null symbols in the first packaged data and the second packaged data, the transmitting being over the isochronous channel, wherein the first packaged data and the second packaged data are selected for transmission over the isochronous channel based on a priority of the first component and the second component, respectively.

19. The mobile device of claim 18,
wherein the second non-isochronous data comprises audio metadata, wherein the third component is an audio component, and wherein the fourth component is an audio component.

20. The mobile device of claim 19, wherein the third component comprises an input clock, and wherein the fourth component comprises an output clock, and wherein the audio metadata comprises an indication that the input clock of the third component is static, and wherein the method comprises when the input clock of the third component is static, stopping the output clock of the fourth device.

21. The mobile device of claim 19, wherein the first communications bridge chip is further configured to perform steps comprising:
buffering the first data stream in a first memory, wherein packaging the first non-isochronous data of the first data stream into first packaged data comprises retrieving the first data stream from the first memory;
buffering the second data stream in a second memory, wherein packaging the second non-isochronous data of the second data stream into second packaged data comprises retrieving the second data stream from the second memory;
determining a first amount of data in the first memory;
determining a second amount of data in the second memory; and
determining to transmit the first data stream over the isochronous channel based on the first amount of data being larger than the second amount of data,
wherein the packaging of the first non-isochronous data of the first data stream into first packaged data and the transmitting of the first packaged data over the isochronous channel are performed in response to determining to transmit the first data stream.

22. The mobile device of claim 18, wherein the first component comprises an audio chip, wherein the second component comprises an application processor (AP), wherein the fourth component comprises a memory chip.

* * * * *

UNITED STATES PATENT AND TRADEMARK OFFICE
CERTIFICATE OF CORRECTION

| | |
|---|---|
| PATENT NO. | : 11,537,544 B2 |
| APPLICATION NO. | : 17/014099 |
| DATED | : December 27, 2022 |
| INVENTOR(S) | : Lambert et al. |

It is certified that error appears in the above-identified patent and that said Letters Patent is hereby corrected as shown below:

In the Claims

In Column 13, Line 39, in Claim 9, delete "apparatus" and insert -- method --, therefor.

Signed and Sealed this
Eighteenth Day of April, 2023

Katherine Kelly Vidal
*Director of the United States Patent and Trademark Office*